United States Patent
Tee et al.

(10) Patent No.: US 9,479,239 B2
(45) Date of Patent: *Oct. 25, 2016

(54) FEEDBACK BASED ON DESIGNATED SUBSET OF CODEBOOK

(71) Applicant: Apple Inc., Cupertino, CA (US)

(72) Inventors: Lai King Tee, Dallas, TX (US); Yi Song, Plano, TX (US); Neng Wang, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,871

(22) Filed: Jan. 18, 2016

(65) Prior Publication Data

US 2016/0134346 A1    May 12, 2016

Related U.S. Application Data

(63) Continuation of application No. 14/561,285, filed on Dec. 5, 2014, now Pat. No. 9,270,351, which is a continuation of application No. 14/146,764, filed on Jan. 3, 2014, now Pat. No. 8,909,156, which is a
(Continued)

(51) Int. Cl.
*H04B 1/00* (2006.01)
*H04B 15/00* (2006.01)
(Continued)

(52) U.S. Cl.
CPC .......... *H04B 7/0456* (2013.01); *H04B 7/0469* (2013.01); *H04B 7/0695* (2013.01); *H04L 25/03828* (2013.01); *H04B 7/0452* (2013.01); *H04B 7/0465* (2013.01); *H04B 7/0639* (2013.01)

(58) Field of Classification Search
CPC .......................... H04B 7/0456; H04B 7/0639
USPC ........................................................ 455/63.1
See application file for complete search history.

(56) References Cited

U.S. PATENT DOCUMENTS

| | | | |
|---|---|---|---|
| 6,157,811 A | 12/2000 | Dent | |
| 8,391,797 B2* | 3/2013 | Tee | H04B 7/0695 455/63.1 |

(Continued)

FOREIGN PATENT DOCUMENTS

| | | |
|---|---|---|
| JP | 2001102995 | 4/2001 |
| JP | 20056358 | 1/2005 |

(Continued)

OTHER PUBLICATIONS

Korean Office Action, Application No. 10-2014-7026776, mailed Nov. 24, 2015, 8 pages.

(Continued)

*Primary Examiner* — Eugene Yun
(74) *Attorney, Agent, or Firm* — Meyertons, Hood, Kivlin, Kowert & Goetzel, P.C.

(57) ABSTRACT

The present invention provides for an improved application of signal strength weightings in a SDMA sectorized cellular network. The improved signal strength weightings application is conducted through the improved selection of weightings from a new codebook subset or by the selection of weightings from a larger codebook subset. In a further embodiment, an antenna beam index or bit map can be used to select the best beam(s) in a SDMA sectorized cellular network. In another embodiment, a field or factor in an uplink or downlink transmission packet can designate which directional transmission beam is best suited for the transmission or when the directional transmission beam should be activated.

20 Claims, 5 Drawing Sheets

Related U.S. Application Data continuation of application No. 13/758,446, filed on Feb. 4, 2013, now Pat. No. 8,644,764, which is a continuation of application No. 12/989,749, filed as application No. PCT/US2009/002585 on Apr. 28, 2009, now Pat. No. 8,391,797.

(60) Provisional application No. 61/048,716, filed on Apr. 29, 2008.

(51) Int. Cl.
*H04B 7/04* (2006.01)
*H04B 7/06* (2006.01)
*H04L 25/03* (2006.01)

(56) References Cited

U.S. PATENT DOCUMENTS

| | | | |
|---|---|---|---|
| 8,634,779 | B2 | 1/2014 | Moulsley et al. |
| 8,909,156 | B2 | 12/2014 | Tee et al. |
| 2003/0181170 | A1 | 9/2003 | Sim |
| 2005/0265430 | A1 | 12/2005 | Ozluturk et al. |
| 2006/0176973 | A1 | 8/2006 | Alamouti et al. |
| 2006/0193373 | A1 | 8/2006 | Agee et al. |
| 2007/0213087 | A1 | 9/2007 | Laroia et al. |
| 2007/0249402 | A1 | 10/2007 | Dong et al. |
| 2007/0265037 | A1 | 11/2007 | Pan et al. |
| 2007/0274411 | A1 | 11/2007 | Lee et al. |
| 2007/0280116 | A1 | 12/2007 | Wang et al. |
| 2008/0075033 | A1 | 3/2008 | Shattil |
| 2008/0080637 | A1 | 4/2008 | Khan et al. |
| 2008/0095121 | A1 | 4/2008 | Shattil |
| 2008/0260058 | A1 | 10/2008 | Li |
| 2008/0303699 | A1 | 12/2008 | Zhang et al. |
| 2009/0028264 | A1 | 1/2009 | Zhang et al. |
| 2009/0041150 | A1 | 2/2009 | Tsai et al. |
| 2009/0080549 | A1 | 3/2009 | Khan et al. |
| 2010/0173639 | A1 | 7/2010 | Li et al. |

FOREIGN PATENT DOCUMENTS

| | | |
|---|---|---|
| WO | 2007050861 | 5/2007 |
| WO | 2007051181 | 5/2007 |

OTHER PUBLICATIONS

TD-TECH, "Adaptive Precoding Matrix Index feedback for MIMO Downlink in TDD", Discussion and decision, Nov. 5-9, 2007, 7 pages, Jeju, Korea.
Ah Chairman, "LTE MIMO AH Summary", Decision, Feb. 12-16, 2007, 8 pages, St. Louis, USA.
Technical Specification 3rd Generation Partnership Project, Technical Specification Group Radio Access Network, Evolved Universal Terrestrial Radio Access (E-UTRA), Physical layer procedures (Release 8), 3GPP TS 36.213 V8.2.0, Mar. 20, 2008, pp. 1-30.
Notice of Allowance from Korean Application No. 10-2010-7026552, issued Jan. 23, 2015, English and Korean versions, pp. 1-15.20056358.
Office Action from Japanese Application No. 2011507428, issued Nov. 19, 2014, English and Japanese versions, pp. 1-25.
"Adaptive Beamforming in E-UTRA", NIT DoCoMo, 3GPP TSG RAN WG1 Meeting #48, Feb. 2007, pp. 1-8.
Shati II, Steve J., "Multiple Input, Multiple Output Carrier Interferometry Architecture," U.S. Appl. No. 09/718,851, filed Nov. 22, 2000, pp. 1-127.
Shatiil, Steve J., "Cooperative Beam-Forming in Wireless Networks," U.S. Appl. No. 60/598,187, filed Aug. 2, 2004, pp. 1-70.
R1-081831, Nortel SL-Antenna Selection, May 5-9, 2008, pp. 1-4.
R1-081668, Nortel WF-Antenna Selection, Mar. 31-Apr. 14, 2008, pp. 1-3.
R1-081179(R4-080426), "LS on implications of MIMO precoding schemes on RAN4 requirements", Mar. 31-Apr. 4, 2008, 1 page.
R1-080886, Ericsson, "Signaling Requirements for 2 Tx Precoding", Feb. 11-15, 2008, pp. 1-3.
"LTE Transmission Modes and Beamforming White Paper", Bernhard Schulz, Oct. 2011—1 MA 186_0e, 1-21.
3GPP TS 36.211 V9.1.0 , "3rd Generation Partnership Project; Technical Specification Group Radio Access Network; Evolved Universal Terrestrial Radio Access (E-UTRA); Physical Channels and Modulation", Release 9, Mar. 2010, pp. 1-85.
3GPP TS 36.211 V8.2.0, "3rd Generation Partnership Project;Technical Specification Group Radio Access Network; 10 Evolved Universal Terrestrial Radio Access (E-UTRA); Physical Channels and Modulation", Release 8, Mar. 2008, pp. 1-65.
U.S. Appl. No. 12/989,749, filed Oct. 26, 2010, Lai King Tee.
"Text proposal on Working Assumptions for MU-MIMO", 3GPP TSG-RAN WG1#49bis R1-073143, Jun. 25-29, 2007, pp. 1-5.
"Refinement of a 2 Tx antenna preceding codebook", 3GPP TSG RAN WG1 Meeting #50 R1-073353, Aug. 20-24, 2007, pp. 1-3.
"Preceding Considerations in LTE MIMO Downlink", TSG-RAN WG1 #48 R1-071044, Feb. 12-16, pp. 1-9.
"MU-MI MO Codebook Subset Selection and Signaling Considerations for E-UTRA", InterDigital Communications, LLC, 3GPP TSG RAN WG1 Meeting #50, R1-073353, Athens, Greece, Aug. 20-24, 2007, pp. 1-14.
"Way Forward on 4-Tx Antenna Codebook for SU-MIMO", Texas Instruments et al., 3GPP TSG RAN WG1 49bis, R1-072843, Orlando, FL, Jun. 25-29, 2007, pp. 1-4.
"Refinement on MIMO Preceding Schemes", Ericsson et al., 3GPP TSG RAN WG1 Meeting #52bis, R1-081565, Shenzhen, China, Mar. 31-Apr. 14, 2008; pp. 1-4.
"On 2-Tx Codebook Subset Selection", Nortel, 3GPP TSG-RAN WG1 #53, R1-082056, Kansas City, Missouri, May 6-9, 2008, pp. 1-4.
U.S. Appl. No. 13/758,446, filed Feb. 4, 2013, Lai King Tee.
U.S. Appl. No. 13/758,519, filed Feb. 4, 2013, Lai King Tee.
Texas Instruments: "Remaining Details of SU-MIMO for E-ULTRA," 3GPP TSG-RAN WG1 #50, R1-073845, Aug. 24, 2007, pp. 1-7.
Office Action for Japanese Patent Application No. 2015-155219, May 11, 2016, pp. 1-9.

\* cited by examiner

| CODEBOOK INDEX | NUMBER OF LAYERS $v$ | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | — |

| CODEBOOK INDEX | NUMBER OF LAYERS $v$ | |
|---|---|---|
| | 1 | 2 |
| 0 | $\begin{bmatrix}1\\0\end{bmatrix}$ | $\frac{1}{\sqrt{2}}\begin{bmatrix}1&0\\0&1\end{bmatrix}$ |
| 1 | $\begin{bmatrix}0\\1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\1\end{bmatrix}$ | |
| 3 | $\frac{1}{\sqrt{2}}\begin{bmatrix}1\\-1\end{bmatrix}$ | — |

*FIG. 5*

| CODEBOOK INDEX | NUMBER OF LAYERS $v$ | |
|---|---|---|
| | 1 | 2 |
| 0 | $\begin{bmatrix}1\\0\end{bmatrix}$ | $\frac{1}{\sqrt{2}}\begin{bmatrix}1&0\\0&1\end{bmatrix}$ |
| 1 | $\begin{bmatrix}0\\1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\1\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-1\end{bmatrix}$ | — |
| 4 | $\frac{1}{\sqrt{2}}\begin{bmatrix}1\\j\end{bmatrix}$ | — |
| 5 | $\frac{1}{\sqrt{2}}\begin{bmatrix}1\\-j\end{bmatrix}$ | — |

| CODEBOOK INDEX | NUMBER OF LAYERS $v$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

FIG. 8

| CODEBOOK INDEX | NUMBER OF LAYERS $v$ | |
|---|---|---|
| | 1 | 2 |
| 0 | $\begin{bmatrix}1\\0\end{bmatrix}$ | $\frac{1}{\sqrt{2}}\begin{bmatrix}1&0\\0&1\end{bmatrix}$ |
| 1 | $\begin{bmatrix}0\\1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\1\end{bmatrix}$ | |
| 3 | $\frac{1}{\sqrt{2}}\begin{bmatrix}1\\-1\end{bmatrix}$ | — |

FIG. 9

| CODEBOOK INDEX | NUMBER OF LAYERS $v$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\begin{bmatrix}1\\0\end{bmatrix}$ | $\frac{1}{2}\begin{bmatrix}1&1\\j&-j\end{bmatrix}$ |
| 3 | $\begin{bmatrix}0\\1\end{bmatrix}$ | — |

| CODEBOOK INDEX | NUMBER OF LAYERS $v$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | – |
| 4 | $\begin{bmatrix}1\\0\end{bmatrix}$ | – |
| 5 | $\begin{bmatrix}0\\1\end{bmatrix}$ | – |

*FIG. 10*

| CODEBOOK INDEX | NUMBER OF LAYERS $v$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | – |
| 4 | $\begin{bmatrix}1\\0\end{bmatrix}$ | |
| 5 | $\begin{bmatrix}0\\1\end{bmatrix}$ | |

*FIG. 11*

FEEDBACK BASED ON DESIGNATED SUBSET OF CODEBOOK

CROSS-REFERENCE TO RELATED APPLICATIONS

This application is a continuation of U.S. patent application Ser. No. 14/561,285, filed Dec. 5, 2015, titled "Codebook Subset Selection", by Lai King Tee, Yi Song and Neng Wang, which is a continuation of U.S. patent application Ser. No. 14/146,764, filed Jan. 3, 2014, which is a continuation of U.S. patent application Ser. No. 13/758,446, filed Feb. 4, 2013 (now U.S. Pat. No. 8,644,764), which is a continuation of U.S. patent application Ser. No. 12/989,749, filed Oct. 26, 2010 (now U.S. Pat. No. 8,391,797), which is the U.S. National Stage of International Application No. PCT/US09/02585, filed on Apr. 28, 2009, which claims the benefit of priority to U.S. Provisional Application No. 61/048,716, filed on Apr. 29, 2008. All of the above-identified applications are hereby incorporated by reference in their entireties as though fully and completely set forth herein.

FIELD OF THE INVENTION

A system and method for selection of codebook subset in a mobile communication system having multiple transmit antennas.

BACKGROUND OF THE INVENTION

There is an increasing demand on mobile wireless operators to provide voice and high-speed data services, and at the same time, these operators want to support more users per basestation to reduce overall network costs and make the services affordable to subscribers. As a result, wireless systems that enable higher data rates and higher capacities are needed. The available spectrum for wireless services is limited, and the prior attempts to increase traffic within a fixed bandwidth have increased interference in the system and degraded signal quality.

One problem exists when prior art omni-directional antennas are used at the basestation because the transmission/reception of each user's signal becomes a source of interference to other users located in the same cell location on the network, making the overall system interference limited. Such an omni-directional antenna is shown in FIG. 1(a). In these traditional mobile cellular network systems, the base station has no information on the position of the mobile units within the cell and radiates the signal in all directions within the cell in order to provide radio coverage. This results in wasting power on transmissions when there are no mobile units to reach, in addition to causing interference for adjacent cells using the same frequency, so called co-channel cells. Likewise, in reception, the antenna receives signals coming from all directions including noise and interference.

An effective way to reduce this type of interference is to use multiple input-multiple output (MIMO) technology that supports multiple antennas at the transmitter and receiver. For a multiple antenna broadcast channel, such as the downlink on a cellular network, transmit/receive strategies have been developed to maximize the downlink throughput by splitting up the cell into multiple sectors and using sectorized antennas to simultaneously communicate with multiple users. Such sectorized antenna technology offers a significantly improved solution to reduce interference levels and improve the system capacity.

The sectorized antenna system is characterized by a centralized transmitter (cell site/tower) that simultaneously communicates with multiple receivers (user equipment, cell phone, etc.) that are involved in the communication session. With this technology, each user's signal is transmitted and received by the basestation only in the direction of that particular user. This allows the system to significantly reduce the overall interference in the system. A sectorized antenna system, as shown in FIG. 1(b), consists of an array of antennas that direct different transmission/reception beams toward each user in the system or different directions in the cellular network based on the user's location.

The radiation pattern of the base station, both in transmission and reception, is adapted to each user to obtain highest gain in the direction of that user. By using sectorized antenna technology and by leveraging the spatial location of mobile units within the cell, communication techniques called space-division multiple access (SDMA) have been developed for enhancing performance. Space-Division Multiple Access (SDMA) techniques essentially creates multiple, uncorrelated spatial pipes transmitting simultaneously through beamforming and/or precoding, by which it is able to offer superior performance in multiple access radio communication systems.

This method of orthogonally directing transmissions and reception of signals is called beamforming, and it is made possible through advanced signal processing at the base station. In beamforming, each user's signal is multiplied with complex weights that adjust the magnitude and phase of the signal to and from each antenna. This causes the output from the array of sectorized antennas to form a transmit/receive beam in the desired direction and minimizes the output in other directions, which can be seen graphically in FIG. 2.

While known methods exist in the conventional mulituser multiple antenna systems that employ an orthogonal precoder to place weightings on the spatially orthogonal beamforming transmissions, the known methods and systems are not optimized in the precoding operations, and thereby fail to optimize the performance on the network. The present invention resolves these problems. Further, the installation of many antennas at single base stations can have many challenges which are resolved by the present invention. Since the available spectrum band will probably be limited while the requirement of data rate will continuously increase, the present invention also supports an expansion of the available spectrum over known methods for precoding in the cellular network.

The various components on the system may be called different names depending on the nomenclature used on any particular network configuration or communication system. For instance, "user equipment" encompasses PC's on a cabled network, as well as other types of equipment coupled by wireless connectivity directly to the cellular network as can be experienced by various makes and models of mobile terminals ("cell phones") having various features and functionality, such as Internet access, e-mail, messaging services, and the like.

Further, the words "receiver" and "transmitter" may be referred to as "access point" (AP), "basestation," and "user" depending on which direction the communication is being transmitted and received. For example, an access point AP or a basestation (eNodeB or eNB) is the transmitter and a user is the receiver for downlink environments, whereas an access point AP or a basestation (eNodeB or eNB) is the receiver and a user is the transmitter for uplink environments. These terms (such as transmitter or receiver) are not meant to be restrictively defined, but could include various mobile communication units or transmission devices located on the network.

SUMMARY OF THE INVENTION

The present invention provides for an improved application of signal strength weightings in a SDMA sectorized cellular network. The improved signal strength weightings application is conducted through the improved selection of weightings from a new codebook subset or by the selection of weightings from a larger codebook subset. In a further embodiment, an antenna beam index or bit map can be used to select the best beam(s) in a SDMA sectorized cellular network. In another embodiment, a field or factor in an uplink or downlink transmission packet can designate which directional transmission beam is best suited for the transmission or when the directional transmission beam should be activated.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 5 is a codebook subset table for antenna selection;

FIG. 6 is a precoding codebook subset table;

FIG. 7 is a precoding codebook subset table;

FIG. 8 is a precoding codebook subset table proposed in the present invention;

FIG. 9 is a precoding codebook subset table proposed in the present invention;

FIG. 10 is a larger precoding codebook subset table proposed in the present invention; and, FIG. 11 is a precoding codebook subset table proposed in the present invention.

DETAILED DESCRIPTION OF THE PREFERRED EMBODIMENTS

Figure 1:
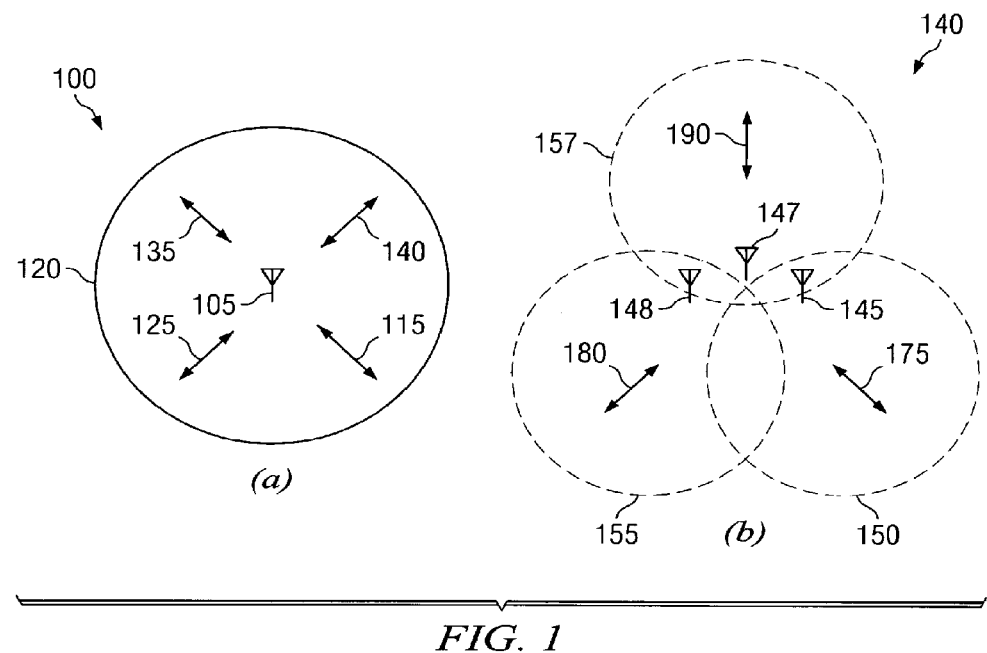
FIG. 1 is a graphical illustration of an omni-directional antenna (a) and a sectorized antenna (b)

In FIG. 1(a), the overall transmission architecture 100 of an omni-directional antenna 105 that transmits radially outward equally in various directions shown by arrows 125, 115, 135 and 140. The perimeter of the coverage area is shown by the area 120 for the transmission architecture 100. Improved efficiencies have been achieved by using the sectorized antenna architecture 140 shown in FIG. 1(b).

Multiple antennas 145, 147 and 148 are shown in the architecture 140, wherein each antenna is directed toward a different region of the cellular network shown by the directional transmission 175 for coverage area 150, transmission 190 for coverage area 157, and directional transmission 180 for coverage area 155. In this context, it is possible for system capacity to be improved by the sectorized architecture.

Figure 2:
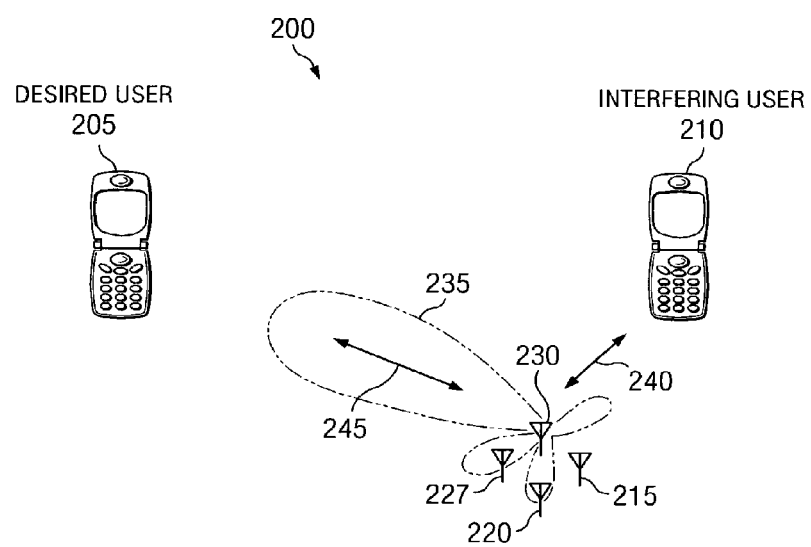
FIG. 2 is a graphical illustration of a weighted sectorized transmission beam directed to the desired user.

By weighting the various transmission signals, additional efficiencies and reduced interferences can be achieved as shown in FIG. 2 for the sectorized architecture 200. Multiple antenna 215, 220, 227 and 230 direct transmissions (or receive transmissions) in the sectorized antenna architecture 200. A directional antenna beam 235 is formed by scaling the signal with a set of weighting factors applied to an array of antenna elements, such as antenna element 230. The desired user 205 is shown receiving a desired transmission 245 in coverage area 235, which is a heavily weighted transmission meant to be directed to that user 205. An interfering user 210 is shown with less weighted transmission signals 240 to reduce the interference encountered by that user 210.

Figures 3, 4:
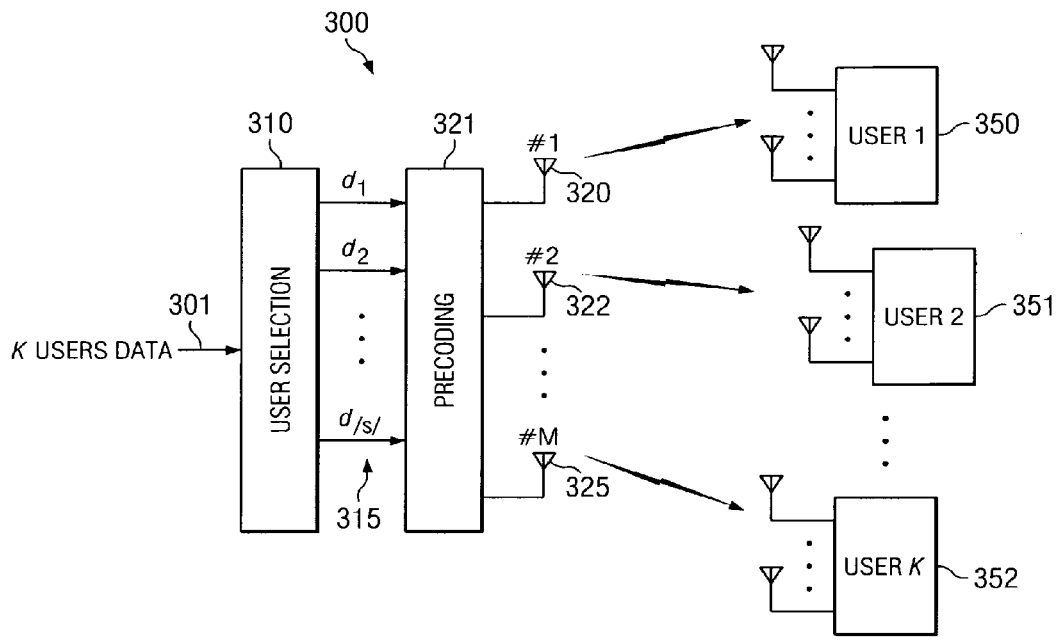
FIG. 3 is a graphical illustration of a multiple antenna transmission system using precoding.
FIG. 4 is a codebook subset table for constant modulus.

In FIG. 3, a precoding architecture 300 is shown where a data input 301 is fed into the user selection component 310. The user selection component 310 sends the appropriate data through the appropriate data signal line 315 to the precoding component 321. The appropriate data for each user 350, 351, 352 may consist of channel encoded, interleaved, rate-matched, scrambled and/or modulated symbols. The precoding component 321 provides an appropriate weighting for the signal strength to be transmitted on the multiple antennas 320, 322 or 325. Based on the targeted user 350, 351 and 352, the signal strength weighting of the multiple antennas to each of these targeted user will be adjusted to increase the efficiency of the data transfer to the desired user and reduce interference with other users on the system.

The selection of specific codes to be used in the precoding component 321 to provide appropriate weightings for the signal strength are shown in several tables documented in FIGS. 4-11. In FIG. 4, a constant modulus 2-Tx codebook is shown, and in FIG. 5, an antenna selection 2-Tx codebook is shown. A codebook accepted under the TS 36.211 v8.2.0 standard is shown in FIG. 6.

There are two possible configurations for the codebook selection using the codebooks at FIGS. 4, 5 and 6. In one configuration, the attachment point (base station/antenna) may select one of the two subsets shown in FIG. 4 or 5 for use in a sector where the user is located. The attachment point selects a subset codebook for all user equipment in the same sector, such as using only the codebook shown in FIG. 4 or 5. The attachment point selects the codebook subset for the user equipment based on some knowledge of the user equipment's channel condition. The channel condition information includes information regarding the user equipment's location information, the error rate for transmissions to the user equipment, the number of re-transmissions to the user equipment, and the uplink sounding or other uplink transmissions, with the uplink received beam-forming using a similar beam pattern as that for the downlink transmission.

In a second configuration, the user equipment can select the appropriate codebook subset to be used in FIG. 6, and the user equipment can select between a total of 9 different distinct codewords for a 2-Tx two transmission antenna system. The user equipment transmits an indicator that implicitly or explicitly indicates which codebook subset is chosen. The subset selection will be dictated in the second configuration through a higher layer activation depending on the codeword selected from the codewords shown in FIG. 6, and the index of the selected codeword in the subset is signaled using 2 bits through the normal PMI feedback indicator field value. To support this approach, the PMI indicator for both the downlink and uplink signaling needs 2-bits.

As an alternative, the codebook shown in FIG. 7 can be substituted for the various codebooks shown above in FIG. 4 or 5. Instead of using the previously-identified codebooks in FIGS. 4-7, the present invention also supports the use of codebook subsets shown in FIGS. 8 and 9, either of which can be used in the above configurations. That is, the codebooks in FIGS. 8 and 9 can be selected using two configurations.

In one configuration, the attachment point (base station/antenna) may select one of the two subsets shown in FIG. 7, and either FIG. 8 or 9 for use in a sector where the user is located. The attachment point selects a subset codebook for all user equipment in the same sector, such as using only the codebook shown in either FIG. 8 or 9. The attachment point selects the codebook subset for the user equipment based on some knowledge of the user equipment's channel condition. The channel condition information includes information regarding the user equipment's location information, the error rate for transmissions to the user equipment, the number of re-transmissions to the user equipment, and the uplink sounding or other uplink transmissions, with the uplink received beam-forming using a similar beam pattern as that for the downlink transmission.

In a second configuration, the user equipment can select the appropriate codebook subset to be used in either FIG. 8 or 9, and the user equipment can select between the different distinct codewords for a two transmission antenna (2-Tx) system. The user equipment transmits an indicator that implicitly or explicitly indicates which codebook subset is chosen. The subset selection will be dictated in the second configuration through a higher layer activation depending on the codeword selected from the codewords shown in FIG. 7, and either FIG. 8 or 9, and the index of the selected codeword in the subset is signaled using 2 bits through the normal PMI feedback indicator field value. To support this approach, the PMI indicator for both the downlink and uplink signaling needs 2-bits.

Further, the attachment point may also use a larger codebook subset table as shown in FIGS. 10 and 11 for use in a sector where the user is located. The attachment point selects a codebook for all user equipment in the same sector, such as using only the codebook shown in FIG. 10 or 11. To support this approach, the original codebook with antenna selection codewords will be optimized using 3 bits, and the PMI indicator for both the downlink and uplink signaling needs 3-bits to allow the proper selection of the increased number of codewords. The selection of the codebook subset for this configuration can also be configured using the Radio Resource Configuration (RRC) signaling, which can select the use of codebooks in FIG. 10 or 11 instead of other default codebook subsets set by the system. The attachment point may also select the codebook subset for the user equipment based on some knowledge of the user equipment's channel condition. The channel condition information includes information regarding the user equipment's location information, the error rate for transmissions to the user equipment, the number of re-transmissions to the user equipment, and the uplink sounding or other uplink transmissions, with the uplink received beam-forming using a similar beam pattern as that for the downlink transmission.

The application of the signal strength weightings can also be optimized using an antenna beam indicator. The indicator may be a field in the uplink or downlink transmission packets. The length (number of bits) for such an indicator will depend on the number of available antennas in the network location. One bit length is sufficient for two antenna architectures, while 2 bits is sufficient to designate up to four antennas. The antenna beam indicator can also be designated according to a bit map with each bit identifying one of the available beams that can be used to communicate with the user equipment.

Based on the specific beam location, the user equipment will provide an indicator bit value or bit map value indicating which beam can provide the best coverage for that user equipment. The use of that antenna beam indicator over a specific period of time will depend on the user equipment mobility, with the indicator being valid longer for slower moving user equipment and being valid for a shorter period of time for faster moving user equipment. Thus, the antenna beam indication needs to be updated with a periodicity corresponding to the changes.

The use of an antenna beam indicator is made possible through the estimation of the uplink transmission condition, such as an analysis of the sounding, random access, or other types of uplink transmissions from the user equipment. The access point may also use a direction-finding algorithm to determine the beam index for user equipment using the SDMA protocols. The CQI index can be used to provide selection information to the access point, which can also analyze the signal-to-interference and noise ratio and identification of the serving beam for the user equipment.

In systems with switching beams or opportunistic beams (e.g. OSTMA), the user equipment provides a CQI index when it is within the coverage area of a beam that has been switched (powered) on. Based on the time when the CQI is received by the access point, the beam index can be implicitly determined because the beam pattern is known by the access point.

The technology as described above allows the configuration of additional codebooks for UE feedback in closed-loop operations, so that a more appropriate codebook can be used to support different antenna configurations, e.g. correlated, uncorrelated or cross-polarized antenna systems. To allow the support of various antenna configurations that would be favorable for different deployment scenarios, e.g., correlated, uncorrelated or cross-polarized antenna systems, LTE-Advanced may support additional codebooks to be used for UE feedback in closed-loop operations. For backward compatibility, higher-layer (RRC) signaling can be used to configure the use of a different codebook by some or all of the UEs conveniently, depending on the UE capability, e.g., Rel-8 UEs or LTE-A UEs, and the deployment configuration, e.g., correlated, uncorrelated or cross-polarized antenna systems. As the codebook is configurable, the larger UE-specific codebook can be configured when a higher capacity is required in the deployed system. Otherwise, the smaller codebook can be used to minimize UE complexity.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for operating a user equipment (UE) device, to facilitate communication with a base station, the method comprising:

transmitting, by a transmitter of the UE device, a codeword index to the base station, wherein the codeword index identifies a first codebook weighting matrix from within a designated subset of a codebook, wherein the codebook includes at least six codebook weighting matrices, wherein each of the codebook weighting matrices includes one or more layer-related columns, wherein each of the layer-related columns includes a plurality of complex weight values having absolute value less than or equal to one;

receiving, by a receiver of the UE device, signals from a channel, wherein the signals have been generated by a precoding operation based on a particular codebook weighting matrix from the designated subset; and recovering, by the receiver, information from the received signals.

2. The method of claim 1, wherein the codeword index is a 2-bit index.

3. The method of claim 1, further comprising:
receiving a downlink index from the base station, wherein the downlink index identifies the particular codebook weighting matrix from within the designated subset of the codebook.

4. The method of claim 1, wherein the complex weight values of the codebook weighting matrices in the designated subset have constant modulus.

5. The method of claim 1, wherein the particular codebook weighting matrix is different from the codebook weighting matrix identified by the codeword index.

6. The method of claim 1, wherein the at least six codebook weighting matrices include a scaled identity matrix, wherein the designated subset does not include the scaled identity matrix.

7. The method of claim 1, wherein the designated subset consists of six codebook weighting matrices, wherein the complex weight values of the six codebook weighting matrices have constant modulus.

8. The method of claim 1, further comprising:
transmitting subset selection bits to the base station, wherein the subset selection bits indicate a selection of the designated subset from the codebook.

9. An apparatus for communication with a base station, the apparatus comprising circuitry configured to implement:
transmitting a codeword index to the base station, wherein the codeword index identifies a first codebook weighting matrix from within a designated subset of a codebook, wherein the codebook includes at least six codebook weighting matrices, wherein each of the codebook weighting matrices includes one or more layer-related columns, wherein each of the layer-related columns includes a plurality of complex weight values having absolute value less than or equal to one;
receiving signals from a channel, wherein the signals have been generated by a precoding operation based on a particular codebook weighting matrix from the designated subset; and
recovering information from the received signals.

10. The apparatus of claim 9, wherein the codeword index is a 2-bit index.

11. The apparatus of claim 9, wherein the circuitry is further configured to implement:
receiving a downlink index from the base station, wherein the downlink index identifies the particular codebook weighting matrix from within the designated subset of the codebook.

12. The apparatus of claim 9, wherein the complex weight values of the codebook weighting matrices in the designated subset have constant modulus.

13. The apparatus of claim 9, wherein the particular codebook weighting matrix is different from the codebook weighting matrix identified by the codeword index.

14. The apparatus of claim 9, wherein the at least six codebook weighting matrices include a scaled identity matrix, wherein the designated subset does not include the scaled identity matrix, wherein the designated subset consists of six codebook weighting matrices, wherein the complex weight values of the six codebook weighting matrices have constant modulus.

15. A non-transitory memory medium for communication with a base station, wherein the non-transitory memory medium stores program instructions, wherein the program instructions, when executed by a processor, cause the processor to implement:
transmitting a codeword index to the base station, wherein the codeword index identifies a first codebook weighting matrix from within a designated subset of a codebook, wherein the codebook includes at least six codebook weighting matrices, wherein each of the codebook weighting matrices includes one or more layer-related columns, wherein each of the layer-related columns includes a plurality of complex weight values having absolute value less than or equal to one;
receiving signals from a channel, wherein the signals have been generated by a precoding operation based on a particular codebook weighting matrix from the designated subset; and
recovering information from the received signals.

16. The non-transitory memory medium of claim 15, wherein the codeword index is a 2-bit index.

17. The non-transitory memory medium of claim 15, wherein the program instructions, when executed by the processor, further cause the processor to implement:
receiving a downlink index from the base station, wherein the downlink index identifies the particular codebook weighting matrix from within the designated subset of the codebook.

18. The non-transitory memory medium of claim 15, wherein the complex weight values of the codebook weighting matrices in the designated subset have constant modulus.

19. The non-transitory memory medium of claim 15, wherein the particular codebook weighting matrix is different from the codebook weighting matrix identified by the codeword index.

20. The non-transitory memory medium of claim 15, wherein the at least six codebook weighting matrices include a scaled identity matrix, wherein the designated subset does not include the scaled identity matrix, wherein the designated subset consists of six codebook weighting matrices, wherein the complex weight values of the six codebook weighting matrices have constant modulus.

* * * * *